United States Patent
Meli et al.

(10) Patent No.: US 6,621,626 B1
(45) Date of Patent: Sep. 16, 2003

(54) MODULAR OPTICAL AMPLIFIER STRUCTURE FOR HIGHLY DENSE INTERLEAVED WDM SYSTEMS

(75) Inventors: Fausto Meli, Piacenza (IT); Fabrizio Di Pasquale, Milan (IT); Giovanni Sacchi, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 10/010,015

(22) Filed: Dec. 5, 2001

(51) Int. Cl.[7] .................................................. H01S 3/00
(52) U.S. Cl. .................. 359/349; 359/337; 359/124
(58) Field of Search ........................... 359/349, 337, 359/333, 124

(56) References Cited

U.S. PATENT DOCUMENTS

| | | | |
|---|---|---|---|
| 5,701,194 A | 12/1997 | Meli et al. | 359/341 |
| 5,748,364 A | 5/1998 | Meli et al. | 359/341 |
| 5,808,787 A | 9/1998 | Meli et al. | 359/341 |
| 5,852,510 A | 12/1998 | Meli et al. | 359/341 |
| 6,025,954 A | 2/2000 | Meli et al. | 359/341 |
| 6,259,555 B1 | 7/2001 | Meli et al. | 359/337 |
| 6,268,951 B1 * | 7/2001 | Chen et al. | 359/279 |
| 6,504,638 B1 * | 1/2003 | Tanaka et al. | 359/179 |
| 6,546,166 B1 * | 4/2003 | Liu et al. | 385/24 |

FOREIGN PATENT DOCUMENTS

EP 0 734 129 A2 9/1996

* cited by examiner

Primary Examiner—Mark Hellner
(74) Attorney, Agent, or Firm—Ritter, Lang & Kaplan LLP

(57) ABSTRACT

An advantageous amplification architecture for DWDM systems including systems with very high capacity is provided. A modular interleaved structure for amplification is provided. Advantages include robustness to non-linear effects, modular as-needed deployment of system capacity, and low noise figure in implementations that incorporate Raman amplification technology.

30 Claims, 4 Drawing Sheets

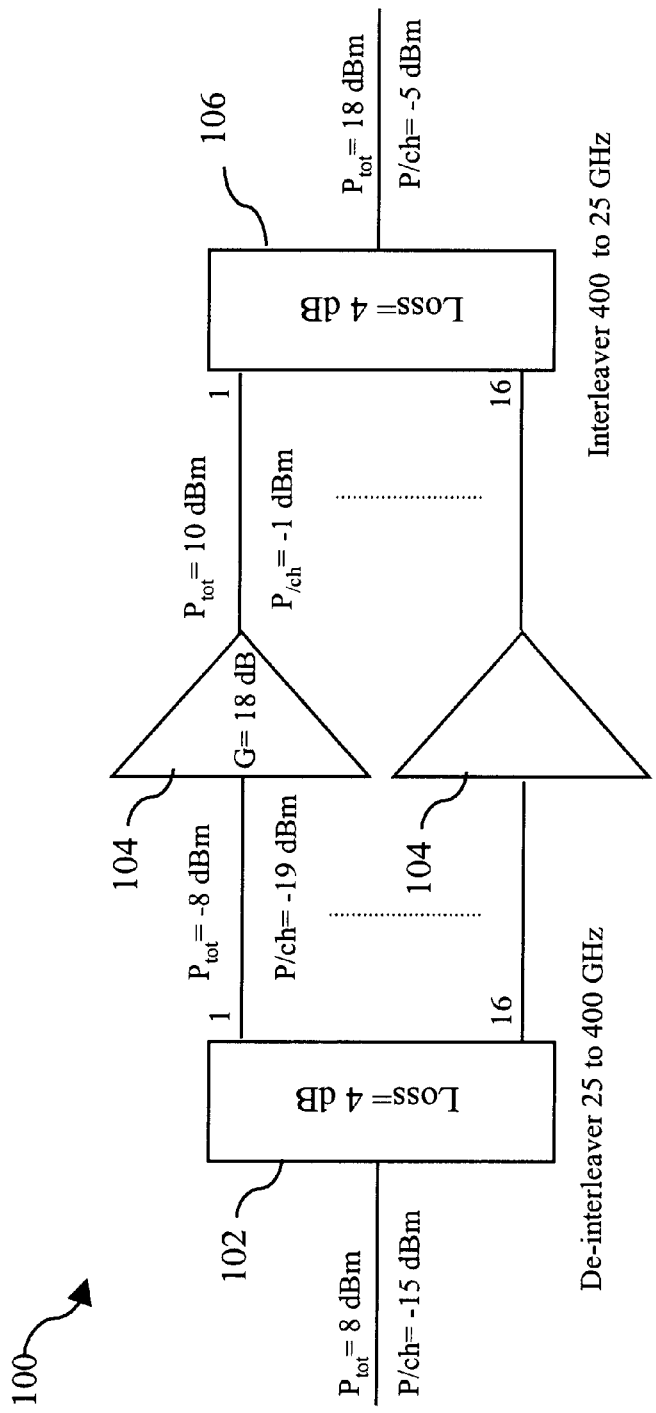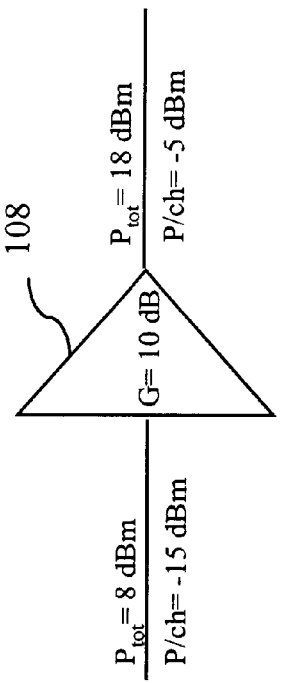
Fig. 1A
Fig. 1B

MODULAR OPTICAL AMPLIFIER STRUCTURE FOR HIGHLY DENSE INTERLEAVED WDM SYSTEMS

STATEMENT OF RELATED APPLICATIONS

The present invention relates to the subject matter of U.S. patent application Ser. No. 10/006,741 entitled "Interleaved Lumped Raman Amplifier Structure Based on Highly Non-Linear Fibers for Densely Spaced WDM Channels," co-filed with the present application and incorporated herein by reference in its entirety for all purposes.

BACKGROUND OF THE INVENTION

The present invention relates to optical communication systems and more particularly to amplification in optical communication systems.

The enormous growth in telecommunication traffic is driving the development of technology to greatly expand the available bandwidth of backbone networks. In particular, there is a great impetus towards increasing the capacity of optical communication links and reducing the costs of implementing capacity-increasing technologies.

One fruitful avenue for increasing the capacity of optical communication links has been combining optical signals with multiple wavelengths onto the same fiber, a practice referred to as wavelength division multiplexing (WDM). Key to the development of WDM systems is the development of optical amplifier technology capable of boosting optical signals in a way that is transparent to data rate and format and that can provide effective amplification across a very large bandwidth.

Continuing development of WDM systems, including the advent of so-called DWDM (dense WDM) systems is increasing the challenges inherent in optical amplifier design. Envisioned future DWDM systems will carry hundreds of very closely spaced optical signals. Spacings of less than 25 GHz are anticipated. Amplifying such a DWDM signal is problematic for a number of reasons. For example, to overcome the non-linearity distortions inherent in such close channel spacings, current Raman amplifier technology requires very high laser pump power to achieve acceptable gain in very short fibers or in fibers having a very low nonlinear coefficient, i.e., a low material nonlinear coefficient and large effective area, and consequently a very low Raman gain coefficient. The additional pump power comes at a high cost.

The very high cost of optical amplifiers capable of amplifying large numbers of closely spaced optical signals creates economic difficulties for service providers planning to install high capacity optical links. When a high capacity DWDM link is deployed, only a small portion of the available bandwidth is used initially with the rest being reserved for future expansion. A large up-front investment must therefore be made even though effective commercial exploitation of the new equipment remains quite far in the future.

What is needed are systems and methods for optical amplification that provide a very high system capacity but take into account relevant economic constraints.

SUMMARY OF THE INVENTION

An advantageous amplification architecture for DWDM systems, including systems with very high capacity, is provided by one embodiment of the present invention. A modular interleaved structure for amplification is provided. Advantages include robustness to non-linear effects, modular as-needed deployment of system capacity, and low noise figure in implementations that incorporate Raman amplification technology.

A first aspect of the present invention provides apparatus for amplification of a WDM signal. The apparatus includes a plurality of optical amplifiers, each amplifying one of a plurality of deinterleaved subband signals. Channel spacing within each of the deinterleaved subbands signals is sufficiently large to suppress non-linear crosstalk distortion by more than approximately 33 dB below a desired signal.

A second aspect of the present invention provides apparatus for amplification of a WDM signal. The apparatus includes a plurality of Raman optical amplifiers, each amplifying one of a plurality of deinterleaved subband signals. Each of the Raman optical amplifiers including fiber that is pumped with optical pump energy. A pump power level of the pump energy injected into the plurality of optical Raman amplifiers is less than or equal to approximately 350 mW per amplifier.

A third aspect of the present invention provides apparatus for amplification of a WDM signal. The apparatus includes a plurality of Raman optical amplifiers. Each of the Raman optical amplifiers amplifies one of a plurality of deinterleaved subband signals. The plurality of Raman optical amplifiers operate in a non-saturated mode.

Further understanding of the nature and advantages of the inventions herein may be realized by reference to the remaining portions of the specification and the attached drawings.

BRIEF DESCRIPTION OF THE DRAWINGS

FIG. 1A depicts a modular interleaved optical amplifier structure according to one embodiment of the present invention.

FIG. 1B depicts a single band amplifier presented as a basis for comparison.

DESCRIPTION OF SPECIFIC EMBODIMENTS

Figure 2:
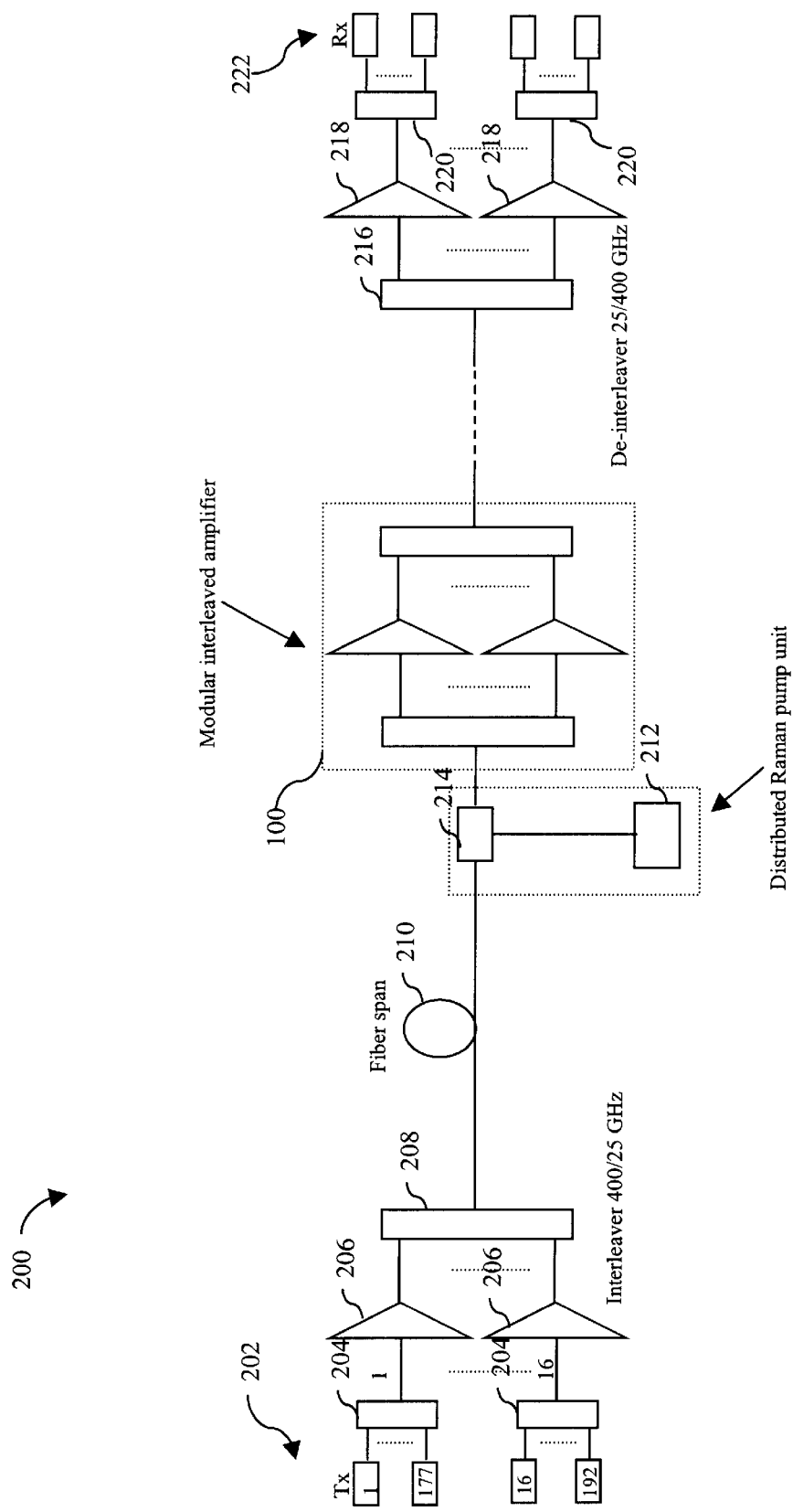
FIG. 2 depicts an optical communications system including a counter-propagating distributed Raman amplifier and a modular interleaved optical amplifier structure according to one embodiment of the present invention.

The present invention relates to optical amplification systems. Prior to amplification, a WDM signal is broken up into two or more subbands. The subbands do not include contiguous WDM channels but rather consist of groups of regularly spaced WDM channels where each subband will typically overlap the other subbands in wavelength coverage. Successive channels in order of wavelength will typically belong to successive subbands. For example, if there are 200 WDM channels, $\lambda_1$ through $\lambda_{200}$, then there may be, e.g., 20 subbands each including 10 channels. A first subband would include $\lambda_1, \lambda_{21}, \lambda_{41}, \ldots \lambda_{181}$. The second subband $\lambda_2, \lambda_{22}, \lambda_{62}, \ldots \lambda_{182}$ and so on. Each channel is typically assigned to a single subband. The spacing of channels within a subband thus will be some multiple of the spacing of the overall grid. Such subbands are referred to herein as deinterleaved subbands.

The subbands are amplified individually. Because of the greater spacing between channels within each subband amplifier, there is a great improvement in the performance in suppressing non-linear affects such as four wave mixing. Each individual amplifier is preferably identical. Accordingly, the structure provides the option of modular deployment of system capacity with amplification hardware being deployed only for subbands that are being used to address current capacity needs.

An optical amplification system according to the present invention may be installed, e.g., at the transmit end of a WDM link, at the receive end, or between spans along the link. At the transmit end, each deinterleaved subband can be generated by multiplexing together the outputs of the appropriate single wavelength WDM transmitters. After independent amplification, the deinterleaved subbands are combined by an interleaver to form an amplified WDM signal. If the optical amplification system is installed between spans, a deinterleaver is used to recover the deinterleaved subbands from the WDM signal and an interleaver is used to combine the amplifier outputs. At the receive end, a deinterleaver is used to recover the deinterleaved subbands and the amplified subbands signals are demultiplexed into individual wavelengths for further receiver processing.

An optical amplification system 100, according to one embodiment of the present invention, is depicted in FIG. 1A. In a representative application of optical amplification system 100, a WDM link carries 192 10 Gbps channels spaced 25 GHz apart for a total bandwidth of approximately 40 nm. A composite WDM signal having these characteristics encounters a deinterleaver 102. Due to the position of optical amplification system 100 along the link and the operative link gain distribution, the WDM signal encountering deinterleaver 102 has a total power of 8 dBm and a power per channel of −15 dBm.

Deinterleaver 102 introduces a loss of 4 dB in the depicted example. Deinterleaver 102 divides the composite WDM signal into 16 deinterleaved subbands. Each deinterleaved subband includes 12 channels spaced 400 GHz apart. Thus, each subband has a total power level of, approximately −8 dBm or −19 dBm per channel. For each of the 16 deinterleaved subbands, there is an optical amplifier 104 having a gain of 18 dB. Optical amplifiers 104 may be e.g., Raman amplifiers, erbium-doped fiber amplifiers (EDFAs), or any suitable optical amplifier type. The outputs of optical amplifiers 104 are amplified deinterleaved subband signals having a total power level of 10 dBm and a per channel power of −1 dBm. An interleaver 106 combines the various deinterleaved subband signals output by amplifiers 104 to form an amplified WDM signal. Interleaver 106 also introduces a loss of 4 dB so that the total output power is 18 dBm and the power per channel is −5 dBm. The total overall gain is 10 dB.

Figure 4:
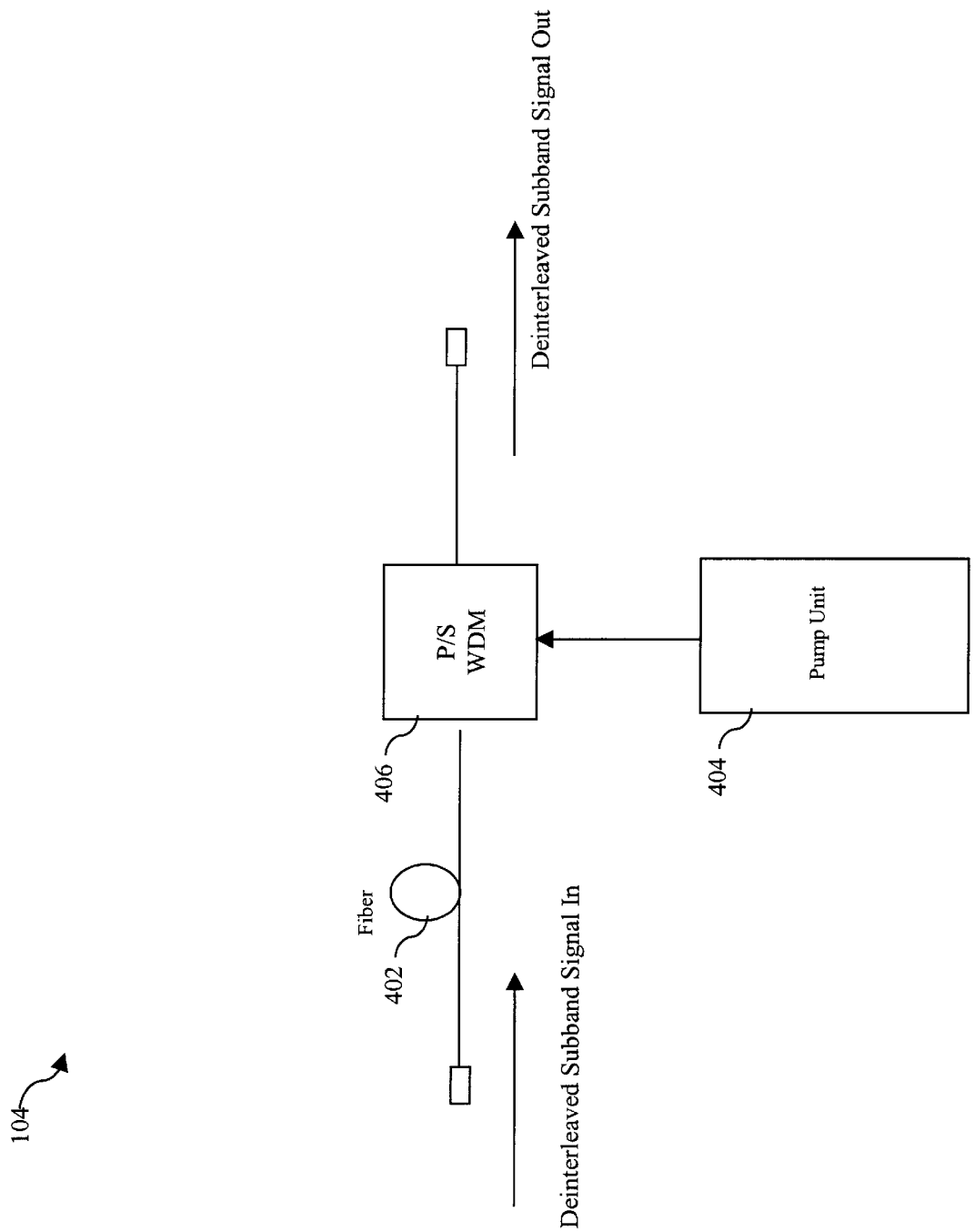
FIG. 4 depicts an amplification element used for a single deinterleaved subband according to one embodiment of the present invention.

Referring now to FIG. 4, details of one embodiment of optical amplifier 104 are depicted. In the depicted embodiment, optical amplifier 104 is implemented as a lumped Raman amplifier. The deinterleaved subband signal to be amplified propagates through a fiber 402 that is pumped with optical pump energy by a pump module 404. Pump module 404 may be, e.g., a single laser, multiple lasers emitting at disparate wavelengths, etc. The pump energy is injected into fiber 402 by use of a pump/signal wavelength division multiplexer 406. The counter-propagating pump energy may also be injected into the fiber using a three port optical circulator. In the depicted embodiment, the pump energy is injected into fiber 402 in a counter-propagating direction, i.e., a direction opposite to the propagating direction of the signal to be amplified.

Optical amplification system 100 has many advantageous characteristics. This can be considered by comparison to a single amplifier alternative depicted in FIG. 1B. In FIG. 1B, a single amplifier 108 has the same overall gain as optical amplification system 100, 10 dB. Also, the total bandwidth of the signal amplified by amplifier 108 is the same as the total bandwidth amplified by each individual optical amplifier 104. However, the channel spacing between the channels for each amplifier 104 is much larger. Also the total input and output powers are much lower for each amplifier 104 than for amplifier 108.

One embodiment of the present invention takes advantage of the much wider channel spacing and the lower total input and output powers to greatly simplify amplifier structure and reduce cost. For example, consider one particular parameter of the lumped Raman amplifier structure depicted in FIG. 4, the Raman gain which is given by:

$$G(dB)=4.34(gL_{eff}/A_{eff})P_p$$

where G (dB) is the Raman gain in dB, g is the Raman gain coefficient, $L_{eff}$ is the fiber effective length, $A_{eff}$ is the fiber effective area and $P_p$ is the pump power.

Due to the wider channel separation and lower signal power provided by the interleaved architecture, the Raman fiber can be optimized in such a way so as to have a very high gain at advantageously low pump power. This is, in part, because the Raman gain can be increased by maximizing the factor $g*L_{eff}/A_{eff}$, without incurring penalties caused by narrow channel spacings and resulting exacerbation of non-linear interactions between channels.

In one class of implementations, $A_{eff}$ is between 3 and 30 $\mu m^2$ and the length of Raman fiber is between 0.5 and 20 Km, e.g., 5 Km. The effective length, $L_{eff}$ is defined as $(1-e^{aL})/a$ where a is the fiber loss at the pump wavelength and L is the fiber length. The fiber is highly nonlinear such that the Raman gain coefficient, $g/A_{eff}$ is greater than 0.005 $W^{-1}m^{-1}$ e.g., 0.007 $W^{-1}m^{-1}$ or higher. For a single wavelength pump module a gain of 18 dB is then achieved using less than 300 mW, e.g., 200–250 mW of pump power per amplifier or less. For a dual wavelength pump module, less than 400 mW of total pump power, e.g., 350 mW or less may be used.

One example of a non-linear interchannel interaction that is ameliorated by this choice of parameters is four-wave mixing crosstalk. The channel spacing and power per channel provided by the deinterleaved structure allow almost negligible non-linear crosstalk distortion e.g., the crosstalk can be attenuated by more than 48 dB below a desired signal level, e.g., about 70 dB, in the above example where the channel spacing within the deinterleaved subbands is configured to be 400 GHz. This crosstalk value is adequate for ultra-long haul links and therefore also for long haul and metropolitan links. In applications where greater cross-talk distortion may be tolerated, much closer spacings, e.g., 50 GHz spacing within only two deinterleaved subbands, may be used to achieve cross-talk suppression of 33 dB or more, e.g., 34 dB.

Another advantage provided by the interleaved amplification of the present invention is that due to the relatively low input power of each of the parallel optical amplifiers 104, these amplifiers operate in a non-saturated mode where it is not necessary to employ any gain control schemes. Thus, the depicted embodiment does not include a gain control system.

Yet another advantage that arises from the relatively high gain, relatively low input power of optical amplifiers 104 is a lower noise figure than would be achieved by a single amplifier structure as depicted in FIG. 1B. This lower noise figure of the amplifier itself at least partially compensates for the attenuation introduced by deinterleaver 102.

FIG. 2 depicts an overall structure of an optical link 200 where an optical amplification system according to the present invention may be applied. Link 200 carries 192 channels spaced 25 GHz apart. Transmitters 202 generate the modulated optical signal at each wavelength. Groups of 12 channels are multiplexed together by multiplexers 204. The outputs of multiplexers 204 are equivalent to the deinterleaved subband signals referred to in the description of FIG. 1A. Each deinterleaved subband signal is amplified by its own amplifier 206. Amplifiers 206 may be implemented, e.g., in any way described with reference to optical amplifier 104. An interleaver 208 then combines the outputs of amplifiers 206 to form a WDM signal. Interleaver 208 is comparable to interleaver 106 of FIG. 1A.

The WDM signal then travels through a fiber span 210. Fiber span 210 may have a length of, e.g., 100 Km. To further reduce non-linear affects and improve optical signal to noise ratio (OSNR) performance, distributed Raman amplification is provided within the fiber span 210. A Raman pump module 212 injects pump energy into fiber span 210 via a pump/signal wavelength division multiplexer 214. Together, Raman pump module 212 and wavelength division multiplexer 214 make up a distributed Raman pump unit that is positioned at the end of fiber span 210. Following the pump unit, optical amplification system 100 is provided as an interspan amplifier. The overall link will include a number of spans 210, each followed by its own distributed Raman pump unit and amplification system 100.

At the receive end of link 200, a deinterleaver 216 essentially equivalent to deinterleaver 106 of FIG. 1A is encountered. This is followed by a set of parallel optical amplifiers 218 that play the same role as optical amplifier 104. Each of the 16 optical amplifiers 218 is followed by a demultiplexer 220 that separates out the individual channels for processing by one of the 192 optical receivers 222. In this architecture, the beneficial pre-amplification effect of the distributed Raman pump unit overcomes any detriment to noise figure caused by the insertion loss of deinterleaver 102.

A further advantage of the interleaved amplification structure arises from modularity. In an initial deployment, one or more amplifiers 104 of FIG. 1A may be omitted if those channels are not required for revenue producing traffic. The amplifiers may then be added in a modular fashion, without affecting current services, as required by increasing traffic demands. Due to the very low pump power required by each amplifier 104, the initial implementation with only a few amplifiers will be relatively inexpensive. The low pump power also leads to a very low cost per channel. Another advantage of this modularity is that failure of one amplifier leads to only one subband being lost rather than loss of the entire WDM link capacity.

The described amplification structure is also readily applicable to optical add-drop multiplexing. In a mid-link optical add-drop multiplexer, some deinterleaved subbands may be amplified for further transmission while others are tapped off to a local receiver. It is also possible to substitute locally generated WDM channels for the ones that have been tapped off.

Figure 3:
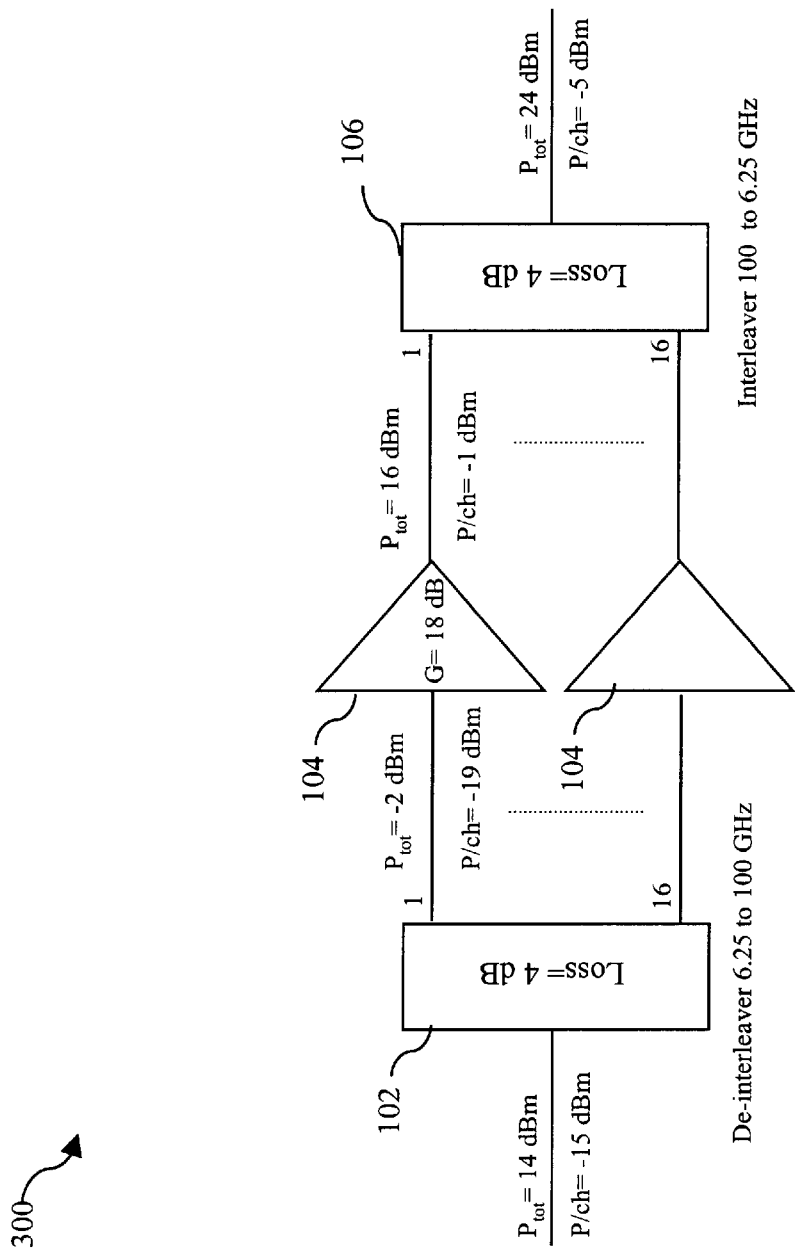
FIG. 3 depicts an alternative modular interleaved optical amplifier structure according to one embodiment of the present invention.

FIG. 3 depicts an optical amplification system 300 for use in a WDM system where 800 channels, each carrying 2.5 Gbps are spaced 6.25 GHz apart for a total bandwidth of approximately 40 nm. The structure is similar to that of optical amplification system 100 with comparable components being given comparable reference designators. The total input power deinterleaver 102 is 8 dBm with a power per channel of −21 dBm. The output of deinterleaver 102 consists of 16 separate deinterleaved subbands each having a total power of −8 dBm and a power per channel of −25 dBm. The deinterleaved subbands have a channel spacing of 100 GHz.

The gain of each optical amplifier 104 is approximately 18 dB with a total output power for each amplifier being 11 dBm and the power per channel being −7 dBm. Interleaver 106 combines the subbands to form a WDM signal having a power level of 18 dBm and a power per channel of −11 dBm. With this very small channel spacing and very high channel count a single amplifier structure as depicted in FIG. 1B is completely impractical due to the deleterious non-linear interactions between the narrowly spaced channels. The system of FIG. 3 achieves approximately 58 dB of four-wave mixing cross-talk rejection with 100 GHz spacing within the deinterleaved subbands. In less demanding applications, 35 dB rejection could be achieved with 50 GHz spacing.

For the optical amplification systems discussed above, a further increase in suppression of non-linear effects may be obtained by decorrelating neighboring channels within each deinterleaved subband. This can be accomplished by incorporating delay lines having different lengths for each deinterleaved subband. A delay line may be incorporated, e.g., either before or after amplifier 104. When DFB lasers are used to generate the WDM signal components, a delay line may include a fiber having a length on the order of tens of meters. This is particularly useful when the lasers used to generate the WDM signal are themselves DFB lasers. A scheme of this general type is disclosed in U.S. Pat. No. 5,677,786, the contents of which are herein incorporated by reference in their entirety.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, counter-propagating pump energy may be supplemented by or substituted for by co-propagating pump energy which would preferably be provided by low relative intensity noise (RIN) lasers.

What is claimed is:

1. Apparatus for amplification of a WDM signal, said apparatus comprising:
   a plurality of optical amplifiers, each amplifying one of a plurality of deinterleaved subband signals; and
   wherein channel spacing within each of said deinterleaved subband signals is sufficient to suppress non-linear cross-talk distortion by more than approximately 33 dB below a desired signal.

2. The apparatus of claim 1 wherein channel spacing within each of said deinterleaved subband signals is sufficient to suppress non-linear cross-talk distortion by more than approximately 48 dB.

3. The apparatus of claim 1 wherein said plurality of optical amplifiers comprises a plurality of Raman optical amplifiers.

4. The apparatus of claim 3 wherein said plurality of Raman optical amplifiers operate in a non-saturated mode without gain control.

5. The apparatus of claim 1 wherein a pump power level of pump energy injected into said plurality of optical Raman amplifiers is less than or equal to 250 mW.

6. Apparatus for amplification of a WDM signal, said apparatus comprising:
   a plurality of Raman optical amplifiers, each amplifying one of a plurality of deinterleaved subband signals, each of said Raman optical amplifiers comprising fiber that is pumped with optical pump energy; and wherein a pump power level of pump energy injected into said plurality of optical Raman amplifiers is less than or equal to approximately 350 mW per amplifier.

7. The apparatus of claim 6 wherein said pump energy comprises pump energy at two or more wavelengths.

8. The apparatus of claim 6 wherein said pump energy is at a single wavelength and said pump power level is less than or equal to approximately 250 mW.

9. The apparatus of claim 6 wherein channel spacing within each of said deinterleaved subband signals is sufficient to suppress non-linear crosstalk distortion by more than 48 dB below a desired signal.

10. The apparatus of claim 6 wherein said plurality of Raman optical amplifiers operate in a non-saturated mode without gain control.

11. Apparatus for amplification of a WDM signal, said apparatus comprising:

a plurality of Raman optical amplifiers, each amplifying one of a plurality of deinterleaved subband signals; and wherein said plurality of Raman optical amplifiers operate in a non-saturated mode.

12. The apparatus of claim 11 wherein said plurality of Raman optical amplifiers operate without gain control.

13. The apparatus of claim 11 wherein channel spacing within each of said deinterleaved subband signals is sufficient to suppress non-linear cross-talk distortion by more than 48 dB below a desired signal.

14. A method of optical signal amplification, said method comprising:

providing a plurality of deinterleaved subband signals;

amplifying each of a plurality of said deinterleaved subband signals to provide amplified deinterleaved subband signals; and wherein channel spacing within each of said deinterleaved subband signals is sufficient to suppress non-linear crosstalk by more than 33 dB below a desired signal.

15. The method of claim 14 wherein channel spacing within each of said deinterleaved subband signals is sufficient to suppress non-linear crosstalk by more than 48 dB below a desired signal.

16. The method of claim 14 wherein amplifying comprises employing Raman amplification effects.

17. The method of claim 14 wherein amplifying comprises amplifying in a non-saturated mode.

18. The method of claim 14 wherein amplifying comprises injecting less than or equal to approximately 350 mW of pump power into a plurality of nonlinear fibers.

19. A method of optical signal amplification, said method comprising:

providing a plurality of deinterleaved subband signals;

injecting less than or equal to 350 mW of optical pump energy into each of a plurality of fibers to induce Raman amplification of said plurality of deinterleaved subband signals; and wherein a Raman gain coefficient of said fibers is greater than $5 \times 10^{-3} W^{-1} m^{-1}$.

20. The method of claim 19 wherein said Raman amplification has a gain greater than or equal to 13 dB.

21. The method of claim 19 wherein said Raman amplification occurs in a non-saturated mode without gain control.

22. The method of claim 19 wherein channel spacing within each of said deinterleaved sub-band signals is sufficient to suppress non-linear crosstalk distortion by more than 48 dB below a desired signal.

23. A method for amplification of a WDM signal, said method comprising:

providing a plurality of deinterleaved subband signals; and amplifying, in a non-saturated mode, each of said deinterleaved subband signals to provide amplified deinterleaved subband signals.

24. The method of claim 23 wherein amplifying comprises amplifying without gain control.

25. The method of claim 24 wherein channel spacing within each of said deinterleaved subband signals is sufficient to suppress non-linear crosstalk distortion by more than 48 dB below a desired signal level.

26. The method of claim 23 wherein amplifying comprises injecting less than or equal to 350 mW of optical pump power into each of a plurality of nonlinear fibers through which said deinterleaved subband signals travel.

27. Apparatus for amplification of a WDM signal, said apparatus comprising:

means for providing a plurality of deinterleaved subband signals; and means for amplifying each of said deinterleaved subband signals to provide amplified deinterleaved subband signals; and wherein channel spacing within each of said deinterleaved subband signals is sufficient to suppress nonlinear cross-talk distortion by more than 33 dB below a desired signal level.

28. The apparatus of claim 27 wherein nonlinear crosstalk distortion is suppressed by more than 48 dB below a desired signal.

29. Apparatus for amplification of a WDM signal, said apparatus comprising:

means for providing a plurality of deinterleaved subband signals; and means for injecting optical pump energy into a plurality of nonlinear fibers to induce Raman amplification of said plurality of deinterleaved subband signals; and wherein a Raman gain coefficient of said non-linear fibers is greater than $5 \times 10^{-3} W^{-1} m^{-1}$.

30. Apparatus for amplification of a WDM signal, said apparatus comprising:

means for providing a plurality of deinterleaved subband signals; and means for amplifying, in a non-saturated mode, each of said deinterleaved subband signals to provide amplified deinterleaved subband signals.

* * * * *